April 23, 1963     S. R. JOHNSON     3,086,488
SOLDER WIPING APPARATUS

Filed Oct. 21, 1958     2 Sheets-Sheet 1

INVENTOR
SCOTT R. JOHNSON

ATTORNEYS

April 23, 1963 S. R. JOHNSON 3,086,488
SOLDER WIPING APPARATUS
Filed Oct. 21, 1958 2 Sheets-Sheet 2

INVENTOR
SCOTT R. JOHNSON
BY
ATTORNEYS

United States Patent Office 3,086,488
Patented Apr. 23, 1963

3,086,488
SOLDER WIPING APPARATUS
Scott R. Johnson, River Forest, Ill., assignor to Continental Can Company, Inc., New York, N.Y., a corporation of New York
Filed Oct. 21, 1958, Ser. No. 768,638
11 Claims. (Cl. 113—97)

The invention relates generally to the art of manufacturing cans and primarily seeks to provide a novel means for removing excess solder deposited on the exterior of the can bodies in the solder bonding of the side seams of a can.

In the making of can bodies such as used for preserving vegetables, fruits, meats or canning of beer, soft drinks, etc., the general practice is to produce the body of the can on a machine known as a body maker which forms hooks on two ends of the body, folds the body about a mandrel, interlocks the hooks and bumps or presses them tight into what is known as a lock seam. The formed and locked can body is then conveyed over a roll revolving in a pot of molten solder which applies the solder to the lock seam. This is accomplished while the can bodies are being rapidly fed along through a guideway known as an outside horse with their side seams disposed lowermost, the feeding operation usually being accomplished by a feeder lug equipped conveyor chain. In order to effect a good solder bond between the adjacent faces of the various portions of the lock seam, the lock seam must remain in contact with the roll, known as a solder roll, until it is brought up to the temperature of the molten solder. This prolonged contact with the solder roll causes molten solder to be built up on the can body immediately adjacent to the seam. This excess solder must be removed both for appearance and economy sake.

The usual, if not universal, method for removing the excess solder is to brush it off with a multi-layer cloth disc revolving in a vertical plane and with the axis of rotation at right angles to the travel of the can body and its seam. The cloth disc is rotated in a direction whereby at the time of contact with the can body its movement is opposite to the direction of travel of the can body. At the same time, its periphery is so positioned to contact the seam of the can body with a slight pressure so that the surplus solder is brushed to the rear end of the seam and off. As a result, as the trailing end edge of each rapidly moving can body passes over the wiping roll, there is a tendency for the cloth disc which forms the wiping roll to throw off a spatter of molten solder bits, and these bits of solder fly into the open ends of the following cans, particularly into the oncoming open end of the next succeeding can body, and adhere to the internal surfaces of the can bodies. There is also a tendency for the advance open end edges of oncoming can bodies to dig into the periphery of the rapidly rotating wiper roll, and this is objectionable because it not only results in excessive wearing of the wiper roll, but also adds to the problem of projecting solder bits into the interiors of the can bodies.

The splattering or splashing of solder into the can bodies is objectionable because the solder pellets adhere to the interiors of the can bodies, often becoming detached during filling of the cans, and when adhered to lacquered or enameled internal coatings of can bodies, these hot solder bits discolor and sometime destroy portions of the protective coatings, and corrosion sometimes results.

Continuous endeavors have been made to eliminate these two major faults of the wiper roll method of removing excess solder by forming the wiper rolls of different materials. Also, attempts have been made to provide revolving blade shields designed to capture the free flying particles of solder with little success. Stationary scrapers have been tried but these become clogged and are not flexible enough to conform to the varying contours of the seam area of a can body.

It is therefore the primary object of this invention to provide a novel form of solder removing device for so removing the excess solder from can bodies whereby splashing or splattering of the solder is eliminated and at the same time distortion of the can body is prevented.

An object of the invention is to provide a solder removing device which includes a surface with a plurality of orifices, which surface will engage the side seams of can bodies under pressure so that the soft solder will be pushed through the orifices and by moving the surface at a different rate from the rate of movement of the can body, the excess solder will be sheared off of the can body.

Another object of the invention is to provide an apparatus of the character stated wherein a reticulated surface is so mounted with respect to moving can bodies immediately after the soldering operation on the side seams thereof whereby the reticulated surface will pressure engage the side seams of the can bodies and be moved at a different rate than the rate of movement of the can bodies, the reticulated surface being preheated to a temperature whereby the excess solder flows into the orifices of the reticulated surface and is first sheared by the relative rate of movement between the reticulated surface and the can body, and drops through the orifices of the reticulated surface due to the temperature of the reticulated surface and thus prevents clogging of the orifices thereof.

A further object of this invention is to proivde a device for removing excess solder from the side seams of can bodies immediately subsequent to the solder bonding of the side seams, the device being in the form of a reticulated strip or belt which is so configurated to shear the excess solder from the can body, the reticulated strip being moved in the same direction as the direction of movement of the can body whereby the advance edge of the can body will readily ride onto the reticulated belt thus eliminating the tendency of the advance open end edge of an oncoming can body to dig into the solder removing device thus eliminating the distortion of the can body.

A still further object is to provide an apparatus of the character stated which includes a reticulated belt which is so mounted with respect to a line of rapidly moving can bodies whereby the reticulated belt engages the can bodies immediately subsequent to the solder bonding of the side seams thereof and pressure engages the can bodies in the vicinity of the side seams whereby the excess solder of the side seams is pressed through the orifices of the reticulated belt, the reticulated belt being moved in the same direction as the direction of movement of the can body, but at a different rate from the rate of movement of the can body whereby as the solder flows into the orifices of the reticulated belt, the relative movement between the can body and the reticulated belt results in the shearing of the solder from the can body, and the relative rate of movement between the reticulated belt and the can body being relatively low so that splattering of the removed solder is eliminated.

With the above and other objects in view that will hereinafter appear, the nature of the invention will be more clearly understood by following the detailed description, the appended claims, and the several views illustrated in the accompanying drawings.

Figure 1:
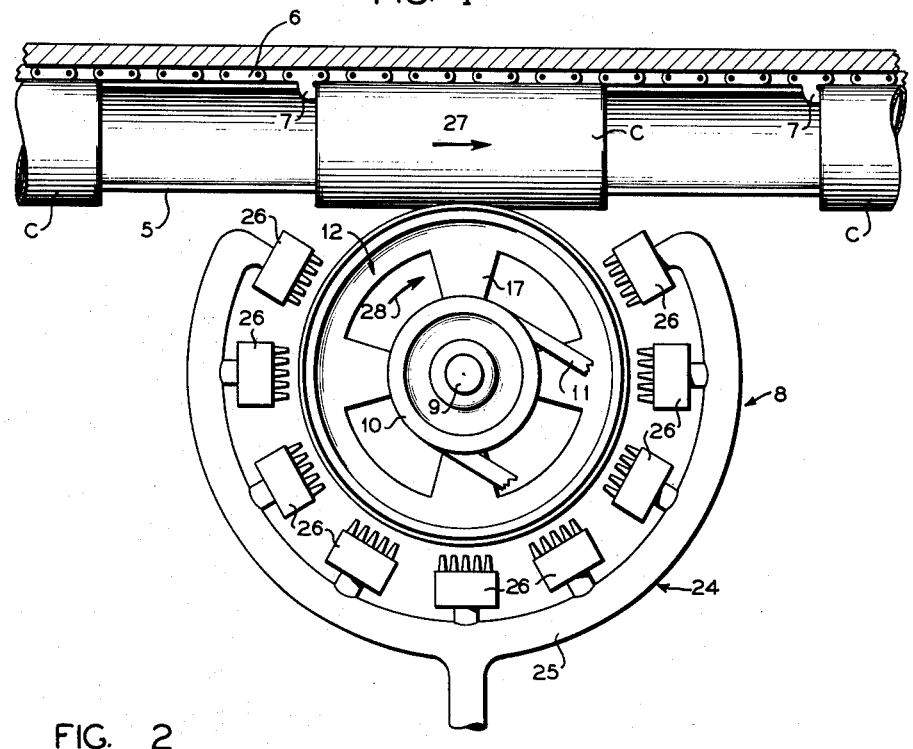
FIGURE 1 is a fragmentary longitudinal vertical section taken along the center of the outside horse, the conveyed cans, the solder removing belt and the support therefor being shown in side elevation.
Figure 2:
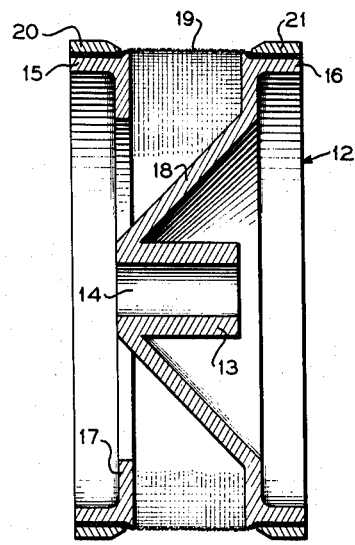
FIGURE 2 is an enlarged fragmentary sectional view through the solder removing belt and the support therefor removed from its operating position and shows the specific details of the manner in which the solder removing belt is carried by the support therefor.
Figure 3:
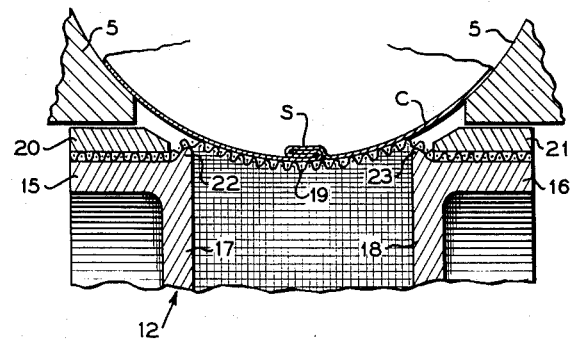
FIGURE 3 is an enlarged fragmentary somewhat diagrammatic transverse vertical sectional view taken through the solder removing belt and a can body at the point of contact between the solder removing belt and the can body and shows the specific relationship between the two.

In the example of the embodiment of the invention disclosed in FIGURES 1, 2 and 3 of the drawings, the usual outside horse is indicated at 5, and through this horse the cans C are conveyed by the usual lug-equipped conveyor chain 6, the lugs 7 of the conveyor chain 6 being spaced so as to provide spaces between the traveling cans. The means for driving the conveyor chain 6 is conventional and well known, as is the construction of the outside horse 5, and are not specifically illustrated herein.

Mounted beneath the outside horse 5 and in longitudinal alinement therewith is a first embodiment of the invention which is referred to in general by the reference numeral 8. The invention includes a shaft 9 which extends transversely of the axis of the outside horse 5 and which is supported in any suitable manner. The shaft 9 carries a drive pulley 10 over which there is entrained a drive belt 11. The drive belt 11 will be entrained over any suitable drive pulley (not shown) for driving the shaft 9 at the desired speed.

Carried by the shaft 9 in alinement with the outside horse 5 is a support which is referred to in general by the reference numeral 12. As is best shown in FIGURE 2, the support 12 includes a central hub 13 having a bore 14 therethrough for receiving the shaft 9. The hub 13 will be locked to the shaft 9 for rotation therewith in any desired manner. Disposed concentric of the hub 13 and in spaced parallel relation is a pair of discs 15 and 16. The disc 15 has a spoke type web 17 which is in alinement with one end of the hub 13 and which is formed integrally therewith. The disc 16 includes a web 18 which is generally conical and which slopes from the disc 16 towards the web 17 of the disc 15. The web 18 is also integrally connected with the hub 13 at that end of the hub 13 to which the web 17 is connected.

Extending about the support 12 and between the discs 15 and 16 is a solder removing belt 19. The solder removing belt 19 is retained in place by means of clamps 20 and 21, respectively, which will be in the form of pipe strap clamps. The solder removing belt 19 will for practical purposes be in the form of an elongated strip of flexible material, the details of which will be set forth hereinafter, which strip is wrapped about the support 12 with the ends thereof slightly overlapped. However, if desired, the solder removing belt 19 may be of an endless construction.

Referring now to FIGURE 3 in particular, it will be seen that the inner edge of the disc 15 is provided with a rounded cross sectional, outwardly projecting annular flange 22. A similar flange 23 is disposed along the inner face of the disc 16. The solder removing belt 19 is arched over the flanges 22 and 23 and thus may be stretched between the discs 15 and 16 for freedom of contact with a can body C.

Referring to FIGURE 1, it will be seen that there is mounted about the solder removing belt support 12 a heating device which is referred to in general by the reference numeral 24. The heating device 24 includes a gas manifold 25 which has mounted thereon a plurality of individual burners 26 which are disposed in circumferentially spaced relation concentrically about the support 12. The individual burners 26 will be so adjusted whereby they will heat the solder removing belt 19 to a temperature wherein the temperature of the solder removing belt 19 at the time of contact with the can body C will be equal to or in excess of the temperature of the molten solder removed by the belt 19.

As is indicated by the arrows 27 and 28 in FIGURE 1, the direction of movement of the can body C and that portion of the solder removing belt 19 in contact therewith will be the same. It is the intention of the invention that the speed of movement of the solder removing belt 19 be either slightly greater or slightly less than the speed of movement of the can body C. Thus while the can body C and that portion of the solder removing belt 19 in contact therewith will be moving in the same direction, there will be a relative movement between the two.

The can body C is limited to movement longitudinally of the outside horse 5 and has the side seam S thereof disposed lowermost, as viewed in FIGURE 3. The support 12 is disposed centrally of the side seam S so that the solder removing belt 19 engages the can body C on opposite sides of the side seam S. The position of the support 12 with respect to the outside horse 5 is such that there is a slight pressure contact between the solder removing belt 19 and the can body C. The solder removing belt 19, being flexible, will conform to the varying contour of the can body in the area of the side seam S.

It is to be understood that the excess solder on the exterior of the can body C will be in a molten stage at the time of the engagement of the solder removing belt 19 therewith inasmuch as the support 12 will be positioned immediately adjacent the point where the solder is applied to the side seam S. Thus the solder to be removed will readily flow into any opening which may be provided in the solder removing belt 19.

Figure 4:
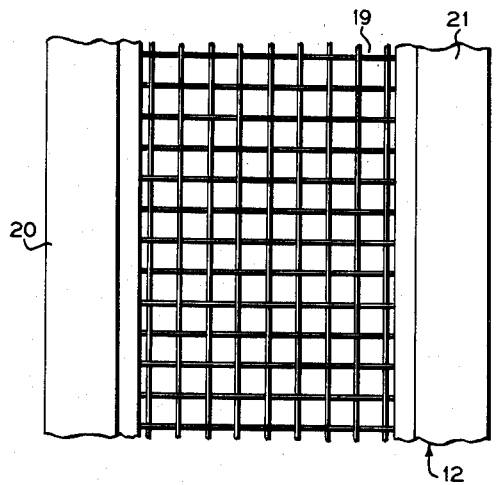
FIGURES 4, 5, 6 and 7 are enlarged fragmentary developed views illustrating several preferred forms of solder removing belts or strips as they would appear when mounted on the support therefor.
Figure 5:
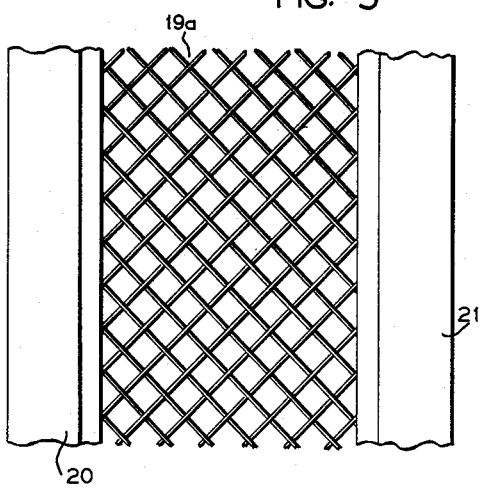
Figure 6:
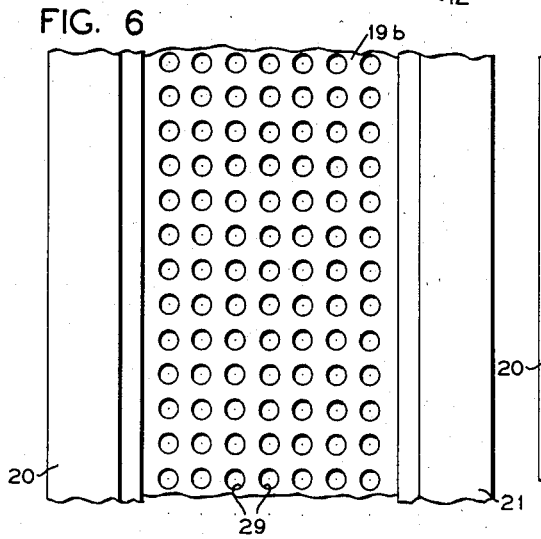
Figure 7:
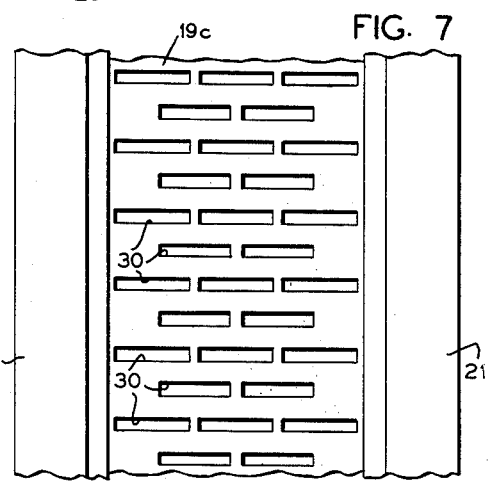

Referring now to FIGURES 4, 5, 6 and 7 there are illustrated several embodiments of the solder removing belt 19. In FIGURE 4, the solder removing belt 19 is in the form of a wire screen which is so cut whereby the wires thereof extend both circumferentially about the support 12 and transversely thereof. In FIGURE 5 the solder removing belt is referred to by the reference numeral 19a and is in the form of a wire screen, such as the wire screen of FIGURE 4, cut on a bias. Thus the individual wires of the solder removing belt 19a extend diagonally between the discs 15 and 16. In FIGURE 6 the solder removing belt is referred to by the reference numeral 19b and, while still in the form of a metal screen, the screen is in the form of a thin metal strip provided with a plurality of perforations 29. The form of solder removing belt illustrated in FIGURE 7 is referred to by the reference numeral 19c and is in the form of a screen which is formed from an elongated thin metal strip having a plurality of transversely extending orifices or slots 30 formed therein. The slots are illustrated as being transversely elongated in outline and in transverse rows with the slots of adjacent rows being staggered. It is, of course, to be understood that the arrangement of the slots or orifices 30 may be varied as is desired to provide the best solder removing characteristics.

It is to be understood that the several forms of solder removing belts illustrated in FIGURES 4, 5, 6 and 7 are only examples of the various forms which the solder removing belt 19 may take. It is generally preferred that the solder removing belt be of such a nature to provide a reticulated surface although it is possible that the solder removing belt may take the form of wires either disposed transversely or diagonally between border wires or other supports.

As one of the can bodies C passes over the solder removing belt 19, which solder removing belt has been preheated to a temperature equal to the temperature of the molten solder on the can body C, due to the pressure contact between the solder removing belt 19 and the can body, the excess molten solder will be forced into or will flow into the orifices in the solder removing belt 19. As the excess solder flows into the orifices of the solder removing belt, due to the relative movement between the can body C and the solder removing belt 19, this solder will be sheared from the can body. Furthermore, inasmuch as the solder removing belt 19 is preheated, the molten solder removed from the can body will not have a tendency to stick to the solder removing belt so as to clog the orifices thereof, but will flow through the solder removing belt 19 down into the support 12 between the discs 15 and 16. Due to the conical shape of the web 18, the removed solder will flow downwardly towards the hub 13 and outwardly towards the web 17 and will pass out through the openings in the web 17 which is of the spoke type. Thus the removed solder may be readily salvaged for economy purposes.

Although the solder removing belt 19 will be rotating at a relatively high rate due to the rate of movement of the can bodies C, inasmuch as the solder removed from the can bodies will immediately drop into the center of the support 12 and exit to one side thereof, it will be readily apparent that the splattering or splashing of the solder removed from the can bodies will be eliminated. In addition to this, inasmuch as the solder removing belt is moving at the point of contact with the can body in the same direction as the movement of the can body, it will be seen that the can body advance edge will freely ride onto the solder removing belt even though there is a pressure contact between the solder removing belt and the can body. Thus distortion of the advance edge of the can body and the undesired removal of a portion of the solder bond therefrom will be prevented.

Figure 8:
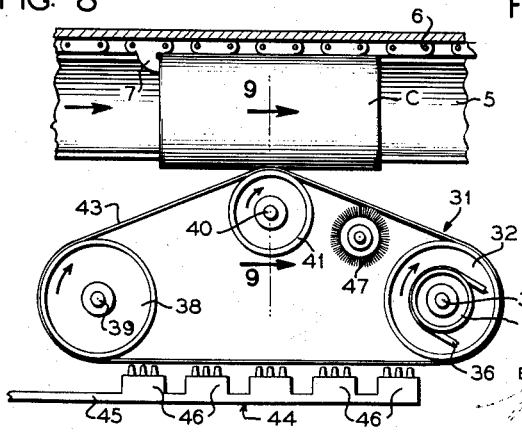
FIGURE 8 is a schematic view on a reduced scale showing a modified form of solder remover.
Figure 9:
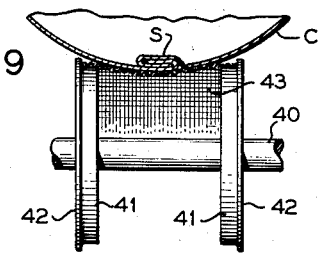
FIGURE 9 is an enlarged fragmentary somewhat diagrammatic sectional view taken on the line 9—9 of FIGURE 8 and shows the support for the continuous solder removing belt at the point of engagement thereof with the can body.

A second embodiment of the invention is illustrated in FIGURES 8 and 9, the second embodiment being referred to in general by the reference numeral 31. This embodiment of the invention is also associated with the conventional outside horse 5 and the conveyor chain 6 for the purpose of moving can bodies C in a straight path with the seam S thereof disposed lowermost.

This second embodiment of the invention includes a drive roller 32 which is carried by a drive shaft 34 and which is in turn driven by means of a pulley 35. Entrained over the pulley 35 is a drive belt 36 whose opposite end is entrained over a drive pulley (not shown) which will be driven in any desired manner to produce the desired rate of movement of the periphery of the drive roller 32.

Spaced from the drive roller 32 is a similar roller 38 which will be considered an idler roller. The idler roller 38 is mounted on a shaft 39. It is desired that the shafts 34 and 39 be disposed in a horizontal plane and that they extend transversely of the axis of the outside horse 5. Disposed above the plane of the shafts 34 and 39 and intermediate the shafts 34 and 39 is a shaft 40 which carries a pair of rollers or discs 41 which are spaced transversely of the axis of the outside horse 5 so as to be disposed on opposite sides of the side seam S of the can body C. This is best shown in FIGURE 9. The shafts 34, 39 and 40 will be supported by a suitable frame structure which has been eliminated for purposes of clarity.

The rollers 32 and 38 may be of a solid type or may be in the form of separate discs, such as the discs 41. Irrespective of the particular construction of the rollers 32 and 38, these and the discs 41 will be provided with outside annular flanges 42 which will function as guides.

Entrained over the rollers 32 and 38 and the discs 41 is an endless solder removing belt 43. The solder removing belt 43 is guided by the annular flanges 42 in a manner best shown in FIGURE 9. The solder removing belt 43 may be of any of the constructions disclosed above with respect to the solder removing belt 19.

Disposed at least below the lower run of the solder removing belt 43 between the rollers 32 and 38 will be a heater 44. The heater 44 will include a gas manifold 45 and suitable burners 46. The heater 44, while illustrated as being a gas heater, will of course, be of any desired construction which will sufficiently preheat the solder removing belt 43 to a temperature whereby the temperature of the solder removing belt will be the same as or in excess of the temperature of the molten solder on the can body C.

As indicated by the arrows in FIGURE 8, the direction of movement of the solder removing belt 43 at the point of contact with the side seam S of the can body C will be the same as that of the can body C. However, in order to obtain a relative movement between the can body and the solder removing belt, the solder removing belt will be driven at a slightly different rate from the rate of movement of the can body.

The support formed by the rollers or discs 41 will be such that a slight pressure contact between the solder removing screen 43 and the can body C in the vicinity of the side seam S will result. As in the case of the solder removing belt 19, the pressure contact between the solder removing belt 43 and the can body C will result in the flow of the excess solder on the exterior of the can body into the orifices of the solder removing belt. The relative movement between the can body and the solder removing belt will result in the shearing of the solder being removed with the result that this solder will be separated from the can body. Inasmuch as the solder removing belt 43 is preheated, the solder will flow through the solder removing belt. In order to assure the complete removal of the solder from the solder removing belt, if desired, there may be placed beneath the solder removing belt 43 intermediate the rollers 41 and the roller 32 a brush 47. The brush 47 will be of the rotating type and may be driven in any desired manner. In order that the solder removed by the solder removing belt 43 may be salvaged, a suitable collector (not shown) for the solder will be provided.

While two specific examples of the present invention are disclosed herein, it is to be understood that the structural features of these two examples can be variously modified without departing from the spirit and scope of the invention as defined in the appended claims.

I claim:

1. In an apparatus of the character described, the combination of a conveyor having a straight run, a can engaging member on said conveyor for feeding open end can bodies in processional order and with their side seams disposed lowermost, a wiper for removing excess solder from the can body side seam, said wiper including a pair of supports of the disc type, said supports being spaced transversely of said conveyor run and disposed on opposite sides of the can body side seam, a reticulated flexible member extending between and extending about said supports with said flexible member presenting an uppermost portion in opposed relation to said conveyor for compressive engagement with the can body side seam, drive means connected to said flexible member and moving said flexible member uppermost portion in the same direction of movement as the can body and at a different rate, and heater means disposed partially about said flexible member for removing solder therefrom.

2. The apparatus of claim 1 wherein said flexible member is in the form of an elongated strip of screen material.

3. The apparatus of claim 1 wherein said flexible member is in the form of thin sheet material having a plurality of transversely extending portions separated by solder receiving openings.

4. The apparatus of claim 1 wherein a pair of rollers are disposed in triangular relation with said supports, said flexible member is entrained over said rollers, one of said rollers being a drive roller with the other of said rollers being an idler roller, and said drive means including said drive roller.

5. The apparatus of claim 1 wherein said flexible member is in the form of a wiper wire extending generally transversely of said conveyor straight run.

6. The apparatus of claim 1 wherein a hub extends between and connects said supports together as a unit, one of said supports includes a conical web having an outer surface sloping towards the other of said supports, and said other support has a perforated web to facilitate the removal of solder.

7. The apparatus of claim 1 wherein the rate of movement of said flexible member is greater than that of a can body having solder removed therefrom.

8. The apparatus of claim 1 wherein the rate of movement of said flexible member is less than that of a can body having solder removed therefrom.

9. In an apparatus of the character described, the combination of a conveyor having a straight run, a can engaging member on said conveyor for feeding open end can bodies in processional order, a wiper for removing excess solder from the can body side seam, said wiper including a pair of supports of the disc type, said supports being spaced transversely of said conveyor run and disposed on opposite sides of the can body side seam, a reticulated flexible member extending between and extending about said supports with said flexible member presenting a portion in opposed relation to said conveyor for compressive engagement with the can body side seam, drive means connected to said flexible member and moving said flexible member portion in the same direction of movement as the can body and at a different rate, and heater means disposed partially about said flexible member for removing solder therefrom.

10. In an apparatus of the character described, the combination of a conveyor having a straight run, a can engaging member on said conveyor for feeding open end can bodies in processional order and with their side seams disposed lowermost, a wiper for removing excess solder from the can body side seam, said wiper including a pair of supports of the disc type, said supports being spaced transversely of said conveyor run and disposed on opposite sides of the can body side seam, a reticulated flexible member extending between and extending about said supports with said flexible member presenting an uppermost portion in opposed relation to said conveyor for compressive engagement with the can body side seam, drive means connected to said flexible member and moving said flexible member uppermost portion in the same direction of movement as the can body and at a different rate, and means disposed partially about said flexible member for removing solder therefrom.

11. In an apparatus of the character described, the combination of a conveyor having a straight run, a can engaging member on said conveyor for feeding open end can bodies in processional order, a wiper for removing excess solder from the can body side seam, said wiper including a pair of supports of the disc type, said supports being spaced transversely of said conveyor run and disposed on opposite sides of the can body side seam, a reticulated flexible member extending between and extending about said supports with said flexible member presenting a portion in opposed relation to said conveyor for compressive engagement with the can body side seam, drive means connected to said flexible member and moving said flexible member portion in the same direction of movement as the can body and at a different rate, and means disposed partially about said flexible member for removing solder therefrom.

References Cited in the file of this patent

UNITED STATES PATENTS

| | | |
|---|---|---|
| 486,331 | Garrison | Nov. 15, 1892 |
| 598,518 | Johnson | Feb. 8, 1898 |
| 746,108 | Kyser | Dec. 8, 1903 |
| 2,233,854 | Snyder | Mar. 4, 1941 |
| 2,322,221 | Cereghino | June 22, 1943 |
| 2,432,788 | O'Brien et al. | Dec. 16, 1947 |
| 2,432,834 | Taylor | Dec. 16, 1947 |
| 2,795,002 | Davies | June 11, 1957 |
| 2,881,729 | Geertsen | Apr. 14, 1959 |